United States Patent [19]

Stoddard et al.

[11] Patent Number: 4,931,872
[45] Date of Patent: Jun. 5, 1990

[54] METHODS OF AND APPARATUS FOR THE GENERATION OF SPLIT-SCREEN VIDEO DISPLAYS

[75] Inventors: James C. Stoddard, Wayland; Ernest P. Tweedy, Lexington, both of Mass.

[73] Assignee: GTE Laboratories Incorporated, Waltham, Mass.

[21] Appl. No.: 934,521

[22] Filed: Nov. 24, 1986

[51] Int. Cl.⁵ ............................................. H04N 5/262
[52] U.S. Cl. ...................................... 358/183; 358/85; 379/53
[58] Field of Search .................. 358/183, 185, 22, 85, 358/181; 379/53, 54

[56] References Cited

U.S. PATENT DOCUMENTS

| | | | |
|---|---|---|---|
| 3,207,842 | 9/1965 | Flagle | 358/183 |
| 3,437,873 | 4/1969 | Eggert | 358/183 |
| 3,736,377 | 5/1973 | Warren Jr. | 358/183 |
| 4,400,724 | 8/1983 | Fields | 379/54 |
| 4,494,144 | 1/1985 | Brown | 358/85 |

FOREIGN PATENT DOCUMENTS 208781  12/1982  Japan ........................ 358/85

OTHER PUBLICATIONS

Introducing Luma, Telephony, Jun. 9, 1986, pp. 42–43.

Primary Examiner—Tommy P. Chin
Attorney, Agent, or Firm—Victor F. Lohmann, III

[57] ABSTRACT

Split-screen video displays are presented at a plurality of different sites for a video teleconference. Video cameras are focused respectively upon the conferees directly, and centrally. The displays at each site show the conferees at remote sites. The positioning of the conferees at different sites on a display is achieved electronically, as by delays of a half a line and/or delays of half a field, rather than by panning or tilting of a camera.

18 Claims, 8 Drawing Sheets

SYNC MEASURING EQUIPMENT

VIDEO DELAY CIRCUITS

METHODS OF AND APPARATUS FOR THE GENERATION OF SPLIT-SCREEN VIDEO DISPLAYS

BACKGROUND OF THE INVENTION

1. Field of the Invention

This invention relates to methods of and apparatus for the generation of split-screen video displays, especially for use in video conferencing, wherein each conferee has the capability of seeing, for example, up to four or five remote separate camera sources on a single monitor. Accordingly, it is a general object of this invention to provide new and improved methods and apparatus of such character.

2. General Background

The method previously in use in the prior art for the generation of a split-screen image was a part of a "special effects" capability in a TV production facility. The requirements to be met to compose such a split-screen image were as follows:

(1) Camera synchronization was to be achieved by reception of a reference composite synchronization signal transmitted from the central equipment location to each camera.

(2) The setting of delay switches at each camera location was required to even up delays from each camera to a central site. This requirement was only necessary when camera distances varied by more than about 300 meters.

(3) At each camera site delay had to be further adjusted to an accuracy of about 1 ns to retain color hue. The maximum variation of this control was about 400 ns.

(4) Before an operator could compose a split-screen picture, each camera had to be mechanically panned and tilted to position the desired image in the required area of the screen to correspond with its appearance in the split-screen display.

The above requirements meant that the received horizontal and vertical synchronization signals from the cameras were nearly time coincident. In addition, the color subcarrier burst phases were synchronized within about 1°. This meant that by using fast analog switches, each picture could be displayed in turn as required on a split-screen display.

The disadvantages of such prior techniques, especially for "switched" video conferences (e.g., a conference of four set up from a possible 10 sites), include:

(1) The necessity to distribute a wideband composite synchronization signal to all cameras (usually via video cable).

(2) The requirement that camera connection to the split-screen equipment had to be initially set up to achieve close line and field synchronization and precise color phase (1 ns), related to the central master, at the split-screen generator.

(3) The necessity to mechanically pan and tilt cameras to position prime subject material into the appropriate area of the screen for split-screen composition. Such panning and tilting was usually not convenient in office-to-office video conferencing where cameras were usually mechanically fixed.

(4) The required use of edges of camera images which might not be as sharp or well converged as the central portion. (Particularly applicable to the more economical color cameras used for video conferencing.)

(5) In some video conferencing systems, a single camera was used for both full screen (e.g., graphics or person) and split-screen modes. In this case it was desirable that the camera did not need to be mechanically panned and tilted between a full screen and split-screen pictures, as this interrupted the continuity of the conference since a significant time was involved.

SUMMARY OF THE INVENTION

Another object of this invention is to provide the new and improved generation of a split-screen image in which all remote cameras are frequency synchronized with a master synchronization signal at a central site by the transmission of a narrow band signal of n times the color subcarrier frequency, where n is an integer selected so as not to interfere with the video, sound, and synchronization signals.

Still another object of this invention is to provide new and improved methods and apparatus for positioning of the primary image of a conferee in the appropriate area of the screen before split-screen combining is carried out electronically, automatically, at a central site, with no camera movement necessary, whereby manual adjustment of electronic pan and tilt can be carried out by an operator to select optimum split-screen composite pictures, and these positions can be memorized and automatically resumed the next time the split-screen input is used in a conference.

Yet another object of this invention is to provide for new and improved methods of and apparatus for the generation of split-screen video displays in which the central area of each picture is used so that the convergence and resolution are optimum.

Still yet another object of this invention is to provide for new and improved methods of and apparatus for the generation of split-screen video displays in which color quality is automatically optimized every time a conference is set up for split-screen display and is continually monitored and readjusted as necessary whereby no manual delay adjustment is necessary.

And, another object of this invention is to provide for new and improved methods of and apparatus for the generation of split-screen video displays that offer a capability especially appropriate for multi-site conferences, where, for example, each one of five conferees can view the other four in a split-screen image.

In accordance with one aspect of the invention, methods of and apparatus for generating a split-screen video display for conferees are provided, wherein specific cameras are focused centrally onto the respective, specific subject. Each conferee is provided with a different monitor display of the remaining conferees at different locations on the monitor, the locations being determined electronically, rather than by mechanically panning and tilting of the cameras.

BRIEF DESCRIPTION OF THE DRAWINGS

Other objects, advantages, and features of this invention, together with its construction and mode of operation, will become more apparent from the following description, when read in conjunction with the accompanying drawings, in which.

DESCRIPTION OF PREFERRED EMBODIMENT(S)

The description is divided into two parts: the first is a general treatment to explain the principle need, the second is the implementation of such a system.

a. General Description

Figure 1:
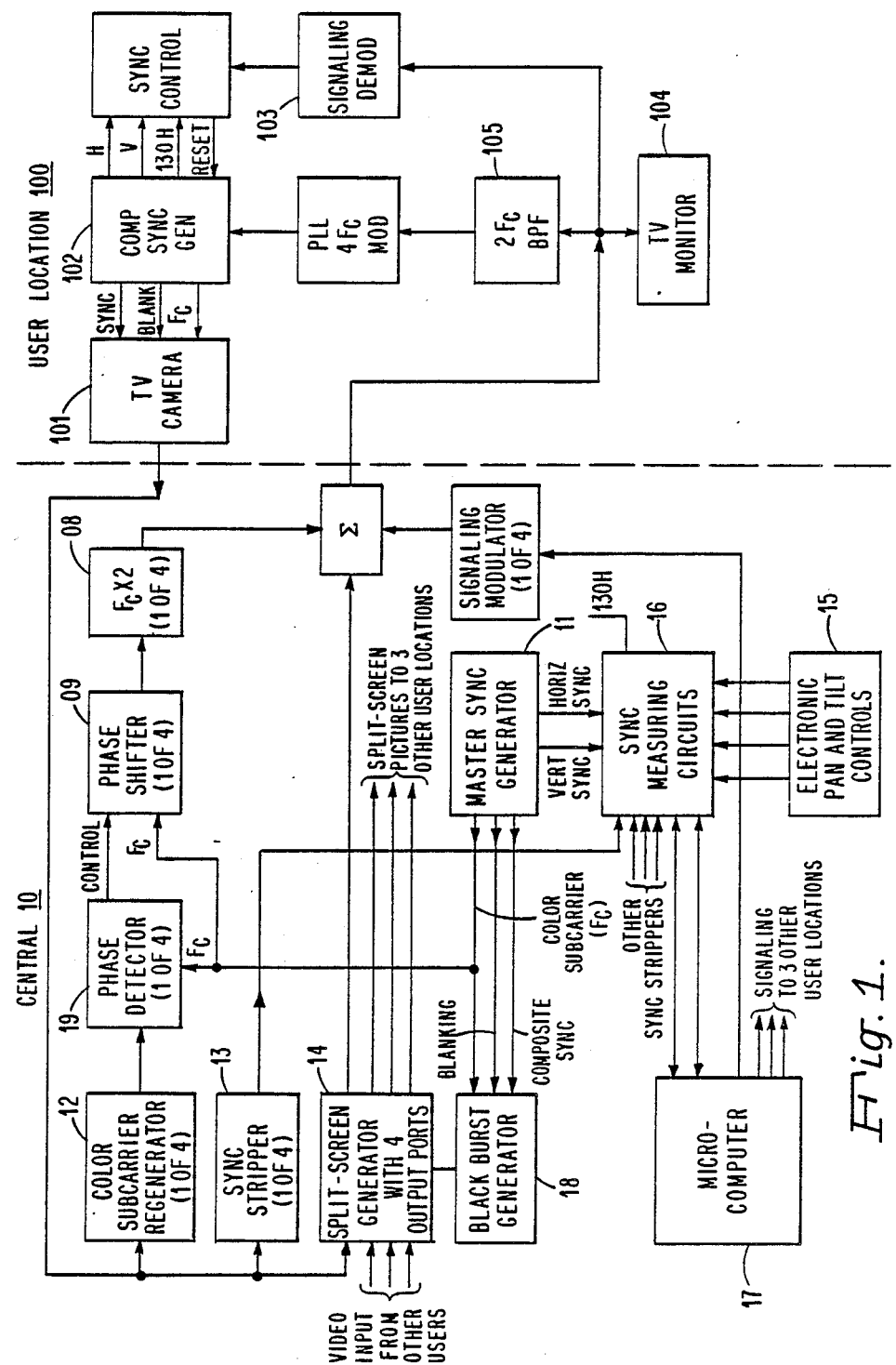
FIG. 1 is a block diagram of a switching center and one of several camera site, in accordance with one embodiment of this invention.

FIG. 1 shows a switching center 10 and one of several camera sites 100. The switching center 10 can be used for setting up video conferences between several sites, or it could be a center, just for generating split screen images from several remote cameras. In the description that follows, the frequency of the color subcarrier is represented by Fc, and the user site is considered first.

(1) User Site

The user site 100 includes a color television camera 101 provided with a set of synchronizing signals generated by count down circuits 102 from a 4×Fc carrier. The set of count-down circuits 102 can all be "reset" when commanded by the central 10 via a signaling demodulator 103 (converts 6 MHz keyed carrier to logic levels). This can be achieved by the central 10 generating a 17-bit number which is adequate to describe a quantity equal to 130 times 525 lines, when the synchronization is found to be incorrect. This number is received at the user site and stored in a register. At the user site 100 at the start of the next field, pulses from a clock (130×horizontal scan frequency) are counted and, when the count equals the incoming number stored in the register, all count-down circuits 102 are reset. After this, the 17-bit number is recalculated at the central 10 so that the reset operation at the user sites coincides with the reset operations of the counters In effect, this is a method of panning and tilting the user camera 101 by time shifting its horizontal and vertical sync pulses related to those generated at the central 10. An area in the center of the picture at the user site 100 can, for example, be moved to any part of the area when displayed using the synchronization pulses generated at the central 10. A jitter-free 4×Fc subcarrier is obtained from the incoming 2×Fc signal by use of a phase-locked loop with a long time constant. The phase of the 2×Fc signal is adjusted at the central 10 so that when the color-subcarrier burst on the camera signal is received at the central 10 it is in phase with the burst generated by the central master sync generator 11.

(2) Central

The incoming signal from each camera 101-401 in the user sites 100-400 is connected to its individual color subcarrier regenerator 12 and a sync stripper 13. In addition, all the incoming camera signals are connected into a split-screen generator 14. The composite sync signals from the strippers 13 are connected into synchronization measuring circuits 16 which also receive vertical sync, horizontal sync, and 130 times horizontal sync signals from the central master sync generator 11. The 130 times horizontal sync pulses are used as a clock to measure the difference between the incoming and central master field sync pulses. The count modulo 130 is the vertical time difference, and the remainder is the horizontal time measurement. The synchronization measuring circuits 16 include an alterable memory that stores values of the clock counts for the frame and line differences normally desired for each site in the split screen picture. These memory values can be modified by operation of pan and tilt controls, a pair for each user site. Such modification is then stored for future use. The incoming sync measurement values are accessed by the microcomputer 17, each source in turn, which then computes the precise 17-bit number to be transmitted back to the user site. The user site count-down circuits 102 are reset when this 17-bit number becomes zero A change could then only take place if the electronic pan and tilt central control had been adjusted or if the synchronization was disturbed by noise.

The split-screen generator 14 is similar to a standard unit, with an exception that the sync timing signals are normally stripped off "channel 1" whereas, for this application, they are internally applied from a black-burst generator 18 driven from the master sync generator 11.

The remaining desired picture control ensures that the received color bursts from each remote camera 101-401 are in phase synchronization with the central master color subcarrier. The color subcarrier from each camera 101-401 phase-locks a subcarrier oscillator in the color subcarrier regenerator 12. This carrier is phase compared with the color subcarrier from the master sync generator 11. The output of this phase detector 19 is used to phase shift the color subcarrier transmitted (at 2×Fc) to the associated camera sites 101-401 until the phase detector 19 achieves zero phase between the two signals. This is carried out in the same way for each of the four camera sites.

FIG. 1 also shows the summing of the outgoing split-screen picture, 2×Fc, and the output of the signaling modem, which uses a simple on-off keyed 6 MHz carrier.

(3) Special Split-Screen Presentation for Conferencing

For video conferencing, where several sites are simultaneously connected together into a single video/audio conference, it may be desirable that each conferee views all others (i.e., excluding himself). This can be achieved by the introduction at the central of one split-screen generator per site, one half-field delay and two half-line delays.

Figure 2:
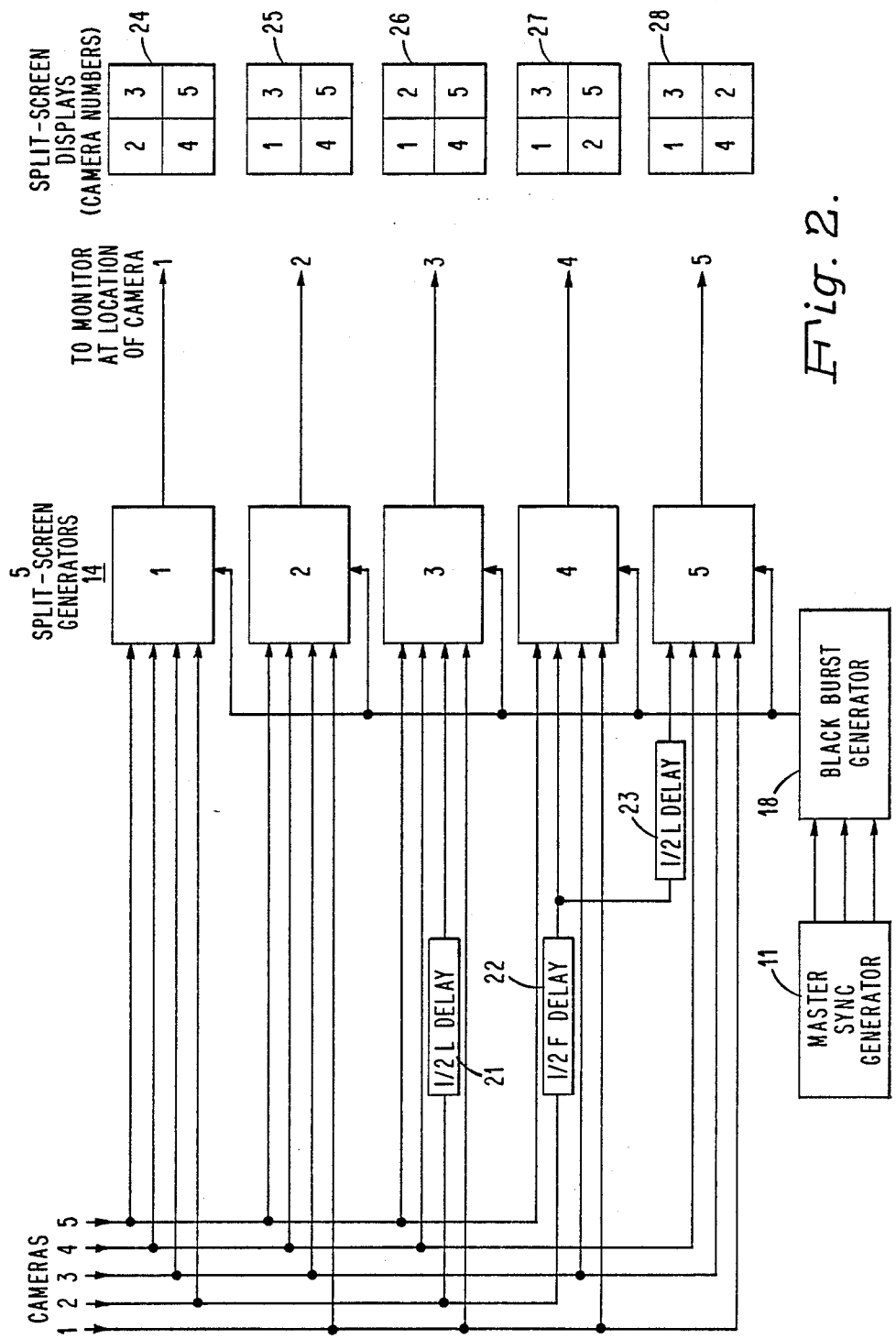
FIG. 2 is a block diagram illustrating equipment arrangement for five conference sites in accordance with a specific embodiment of the invention.

As an example, FIG. 2 shows the equipment arrangement for five conference sites, so that each can view a split-screen presentation of the other four. The incoming video signals are shown as cameras 1 to 5. Each camera signal is split four ways for connection into four of five split-screen generators 14. Camera 2 is connected to split-screen generators numbers 3, 4, and 5 via a half-line delay 21, a half-field delay 22, and a half-line 23 plus a half-field delay 22, respectively. The black-burst generator 18 provides the same sync signals, including color burst, to all split-screen generators 14. The incoming camera signals have already been set up so that, when displayed with the central composite sync, the prime subject is positioned in a selected quadrant. For example, the diagram 24 at the top of the split-screen display shows cameras 2, 3, 4, and 5 in the four quadrants. This composite picture is returned to the monitor 104 associated with camera 1. The positions of four of the five incoming camera signals remain in the same quadrant on all split-screen displays 24–28. However, the camera 2 signal starts off in the upper left quadrant of the display 24 to be returned to camera 1 site. It is delayed by half a line to be positioned in the upper right quadrant of the picture 26 to be transmitted to the camera 3 site. For camera 4 site, the camera 2 signal is delayed by half a field to place it in the lower left quadrant of display 27. Further, for camera 5 site, the camera 2 signal is delayed by a time period equal to half a field plus half a line to place it in the lower right quadrant of the display 28.

b. Systems Implementation (1) General

A complete video conferencing switched system, demonstrating the capabilities of such a service, comprises six video conferencing offices that can be included in either full screen or split-screen conferences by switch control. This description covers aspects of the system relevant to the invention.

For economy and convenience, NTSC television channels can be used. These include a sound carrier, and permit a television receiver to be used as a monitor and a sound receiver. As optical fibers connect the user sites to the central, the television channel is selected on a low frequency that can directly amplitude modulate the optical transmitter.

Figure 3:
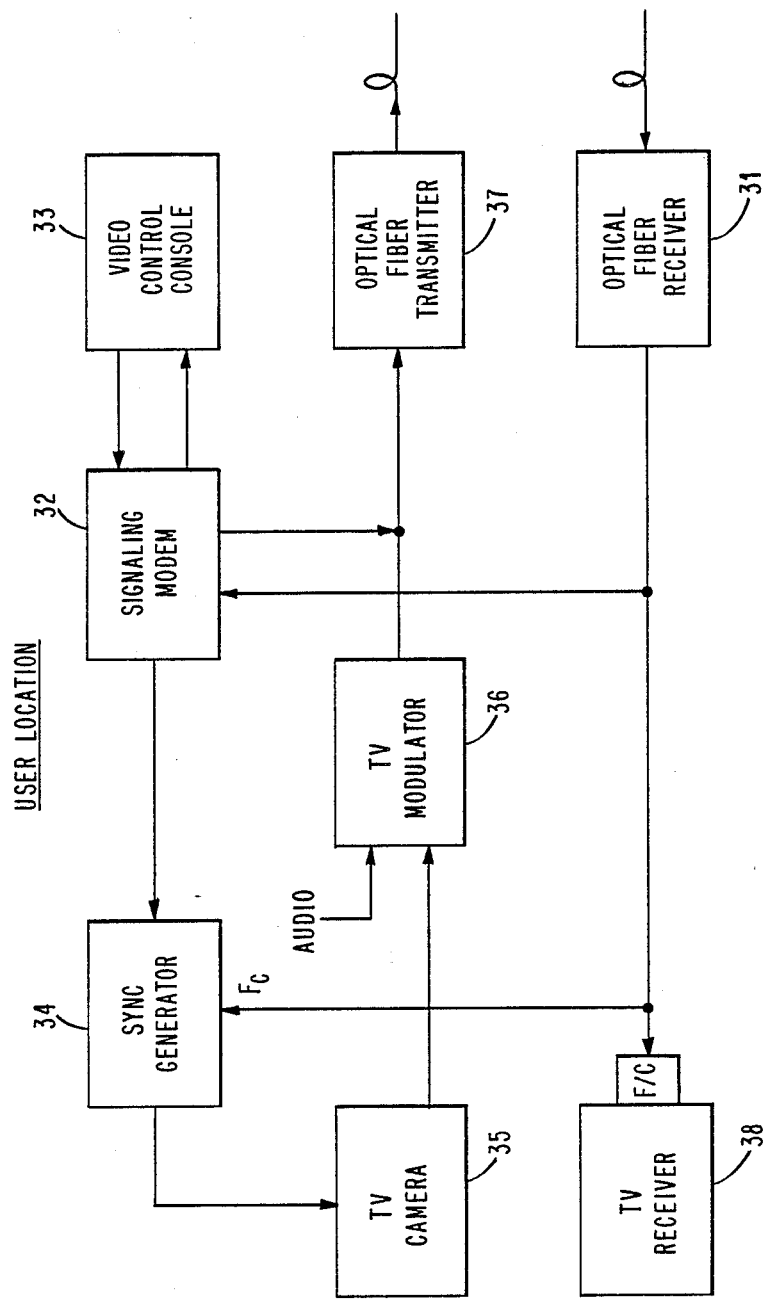
FIG. 3 is a diagram illustrating apparatus at a user site.

The equipment at a user site can be seen in FIG. 3. The incoming signal from the central is received by the optical fiber receivers 31 as a 20 MHz baseband. This includes a vestigial side-band (VSB) television channel (12 MHz luminance, 7.5 MHz sound carriers), an on-off 2 MHz carrier signaling channel, and a color subcarrier (3.58 MHz). The VSB channel is frequency changed to TV receiver 38 channel 3 by use of a mixer and a 73.25 MHz local oscillator. The signaling modem 32 receives the on-off 2 MHz carrier which has a number of time division multiplexed signals included on its 192 kB/s data rate. One of these is fed into the video control console 33 for handshaking, display functions and control of the sync generator 104 used to reset the count-down circuits for camera 35 pan and tilt. The video control console 33 retransmits the sync generator 34 control signals. The color subcarrier frequency is used both to generate the camera composite sync and to control the color burst phase. The video output of the camera 35 and the audio signal are connected into the VSB TV modulator 36 with the luminance carrier on 12 MHz and the audio carrier on 7.5 MHZ. These two carriers are summed with the 192 kB/s on-off keyed 2 MHz carrier before being sent, via the transmitter 37, over the outgoing optical fiber.

Figure 4:
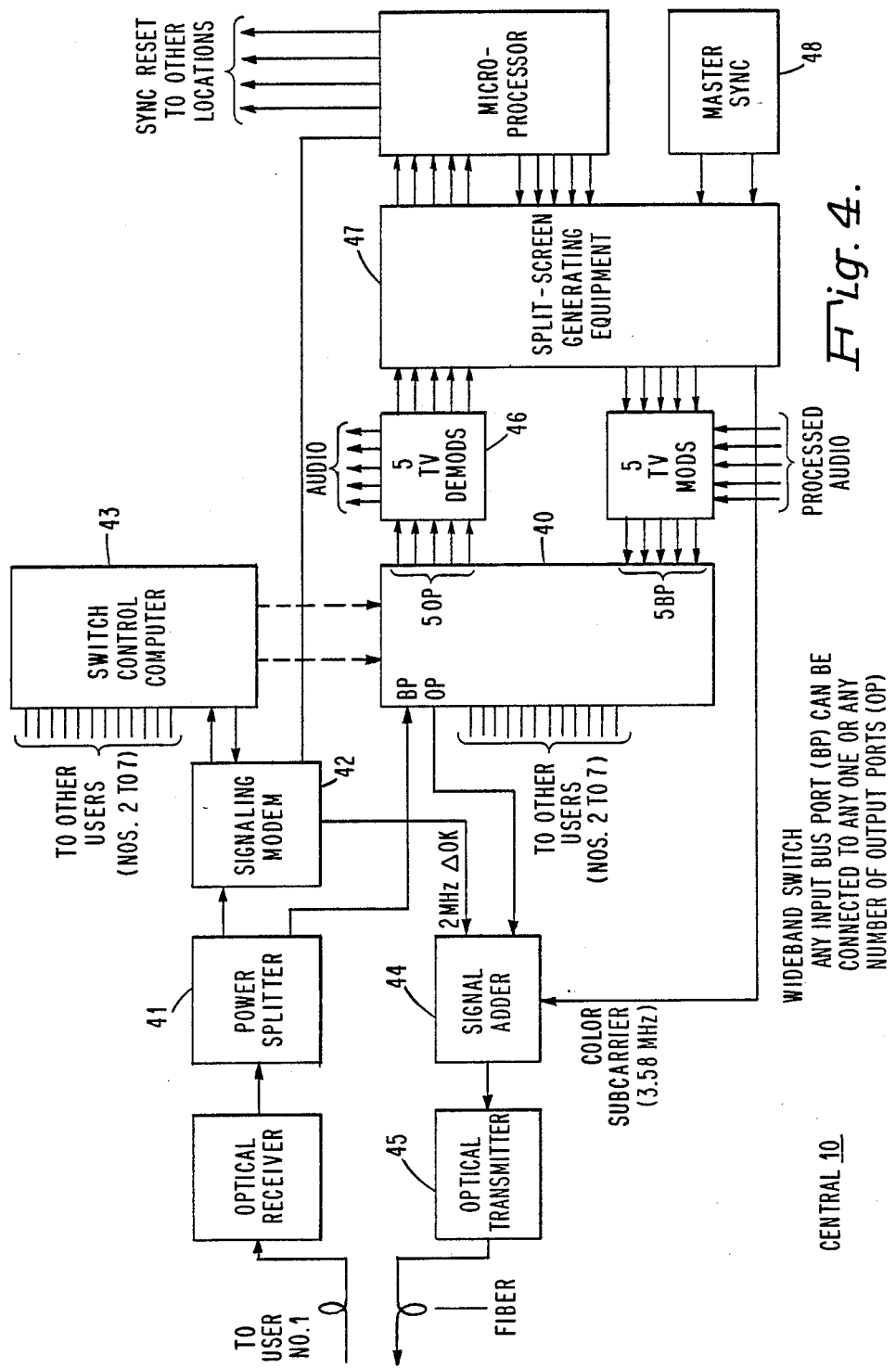
FIG. 4 is a diagram of apparatus suitable for a switching center.

The equipment in the central 10 is shown in FIG. 4. The system is built around the wideband switch 40 which is provided with input bus ports and output user ports. Any input bus can be connected to any output port or any number of output ports by command of signaling sequences. Each user is allocated an input bus and an output port. In addition, each split-screen signal is provided with an input bus and an output port. Each signal coming from the conference site is split, via power splitter 41, into the signaling modem 42 and an input bus of the wideband switch 40. The signaling modem 42 directs signaling sequences from the conferee's video control console 33 to the computer switch control 43. The VSB TV signal is connected into an input bus port on the wideband switch 40. The outgoing TV signal from an output port of the wideband switch 40 is summed (via signal adder 44) with the 192 kB/s on-off keyed 2 MHz signaling carrier and a phase controlled color subcarrier frequency of 3.58 MHz before being transmitted by the optical fiber transmitter 45 to the user sites. Five output ports of the wideband switch 40 are connected to demodulators 46 which provide the baseband video signal for the split-screen generators 47 and baseband audio for processing (each user site hears the sum of all audio sources except his own).

A standard split-screen generator 47 is modified so that instead of using the sync signals and color burst from input 1, they are introduced from a central master sync generator 48. Other equipment associated with the generation of the split screen display is shown in FIG. 1 and described above. In this case, the actual color subcarrier frequency on 3.58 MHz is transmitted to the user site for generation of its frequency locked composite sync and to ensure that the color burst as received at the central is in phase with the centrally generated color burst used in the split-screen generator.

The detail of the various individual components of the system are now described. At the user site 100, the incoming signal is split into components, one to drive a television receiver 104 and the other to connect the 3.58 MHz carrier via a band-pass filter 105 BPF into a phase-locked loop regenerator 102. This provides a clean color subcarrier as a reference to generate the TV camera 101 synchronization signals A black-burst generator signal is required for the gen-locking of the TV camera 101 and it is driven by composite sync, blanking, and color subcarrier from the TV sync generator 102. The output (12 MHz luminance carrier, 7.5 HMz sound carrier) of a TV modulator is carried over the optical fiber loop to the central. After demodulation, the video baseband signal is connected into the color corrector 12 circuits, the sync stripper 13, and the split-screen equipment 14.

The central master sync generator 11 supplies composite sync, color subcarrier, and blanking to the black-burst generator 18, and composite sync alone to each quad-split-screen generator 14, which also receives the output of the black-burst generator 18.

The output of the sync stripper 13 is connected into the sync measuring circuitry 16, microcomputer 17 and video controller 15. These components are described hereinafter. They generate the binary number which is directed to the user site for resetting the count-down circuits as described above.

The control of the color burst phase at the camera is now described. The incoming video from each camera is connected into a color subcarrier regenerator 12 which is similar to that used in a television receiver. A phase-trim control is used to preset its phase in that it will be correct at the split-screen generator 14 when phase locked to the centrally generated color subcarrier in the phase detector 19. The output of the phase detector 19 operates a phase shifter 09 which changes the phase of the centrally generated color subcarrier before being transmitted to the user site. A low-pass filter 08 is used to prevent harmonics of the color subcarrier from interfering with the 12 MHz TV channel.

Figure 5:
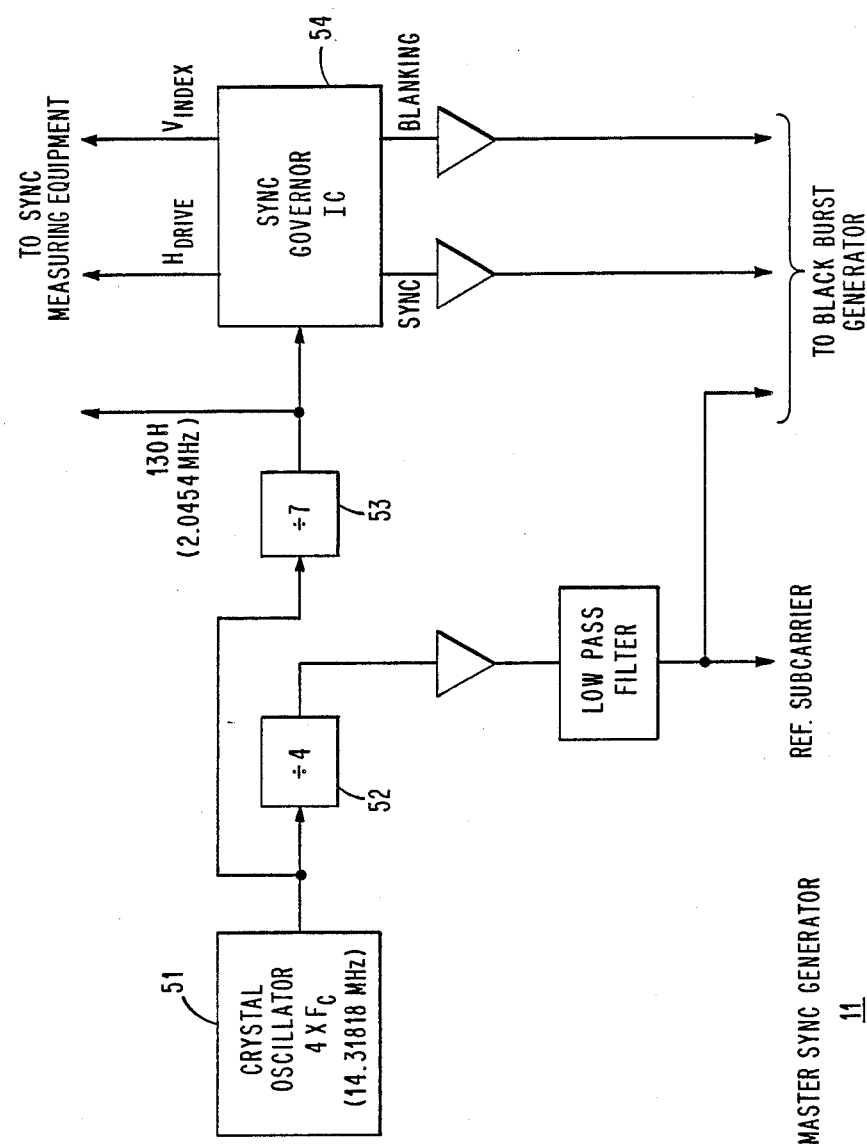
FIG. 5 is a diagram of a master sync (synchronization) generator suitable for use in this invention.

(2) Details of Microcomputer, Master Sync Generator and Sync Measuring Equipment The components for the master sync generator 11, sync measuring equipment 16, and split-screen microcomputer 17 are interconnected and located on a single board. The relationship of these units to the total system 10 is shown in FIG. 1. The block diagram of the master sync generator 11 is shown in FIG. 5. This unit produces the master timing for all video conferencing signals in the system. The crystal oscillator 51 frequency of 14.318180 MHz is four times the NTSC color subcarrier frequency. Standard $T^2L$ logic dividers 52, 53 produce the subcarrier frequency and 4/7th the subcarrier frequency (2.045 MHz) required by the sync generator 54. The sync generator produces NTSC sync and blanking signals which are combined with the subcarrier signal in a commercial black-burst generator 18. The output of the black-burst generator 18 feeds the split-screen generator 14 creating the blanking, sync and color burst portions of the split-screen output.

Figure 6:
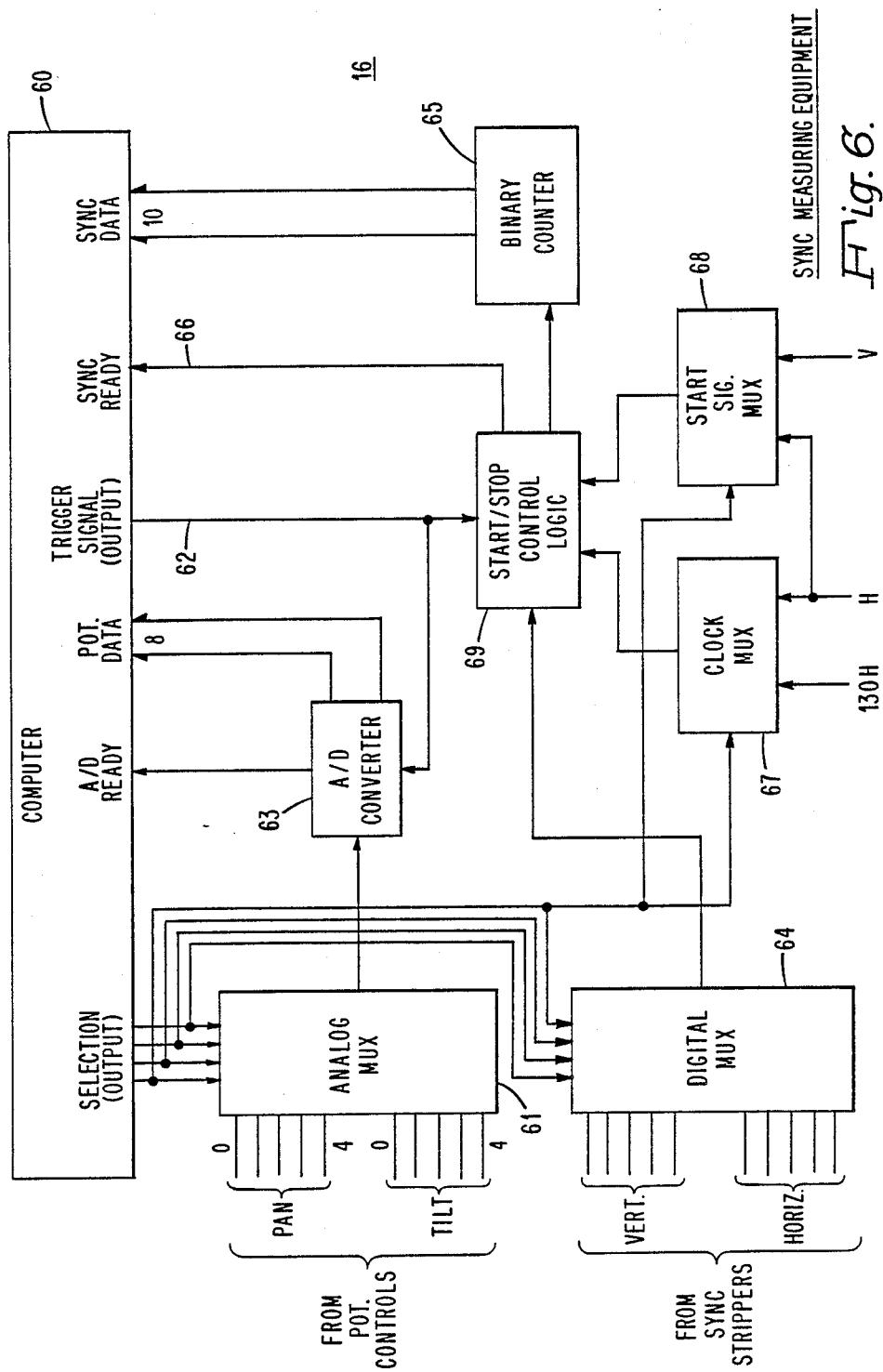
FIG. 6 is a block diagram of a sync measuring equipment further useful in an embodiment of this invention.

It is noted that the actual implementation described below differs from the earlier description in that a combined vertical and horizontal measurement and correction were earlier considered, where here separate measurements and corrections are made. FIG. 6 is a block diagram of the sync measuring equipment 16 which is controlled by the computer 60. The computer 60 sequentially makes measurements on the time difference between input sync pulses (obtained from the sync strippers) and the reference sync signals. In addition, signals from the operator adjusted pan and tilt potentiometers are digitized and fed to the computer 60. A dc voltage indicating potentiometer position is fed to the analog multiplexer 61. The computer 60 selects the inputs in sequence and outputs a pulse on the trigger signal line 62 to start the analog-to-digital (A/D) converter 63 digitizing the selected input. The computer 60 is programmed to sense when the A/D conversion is complete and reads in the digital value.

Separate horizontal and vertical sync signals are recovered from each conferee's video signal by commercially available sync strippers 13. These sync signals are fed to a digital multiplexer 64 that is controlled by the computer 60 in parallel with the analog multiplexer 61 used for selection of the pan and tilt potentiometer signals. The time difference between the incoming and reference sync pulses is measured by starting and stopping a train of pulses fed to the binary counter 65. The reference sync signal starts the counting, and the received signal stops the counting. The train of pulses for the horizontal sync measurement is 130 times the horizontal frequency and the horizontal frequency is used for the vertical sync measurement. The sync measuring sequence is started by a pulse from the computer 60 on the trigger signal line 62 and the resulting count is read by the computer 60 after the computer 60 has sensed the sync ready signal 66 that goes high when the measurement has been completed. Clock 67 and start signal 68 multiplexers steer the appropriate pulses to the start/stop control logic 69 and a counter 65.

The computer 60 can be a commercial unit such as an Intel SDK-85 single board computer. Part of the board area is available for the user to add circuitry. The master sync generator 11 and sync measuring equipment 16 can be built on this section. The computer 60 includes an 8085 microprocessor, 2 PROMs with input/output lines, 2 RAM memory ICs with input/output lines that also include timer functions. Also part of the standard computer are ICs (integrated circuits) to interface to an on-board display and keyboard which are not required for the split-screen function. The programs for the split-screen application are stored in two PROMs. A standard USART 80 provides a serial port for the split-screen computer to communicate with the wideband switch computer.

The program sequentially selects the synchronization and potentiometer signals corresponding to the sites in use. A set of reference sync values for each split-screen site and format are stored in the computer memory. After each measurement the computer performs a calculation comparing the measured values to the stored values, and decides whether a correction is needed. A message is sent out when a correction is necessary.

FIG. 1 shows a separate signaling output going to each user site. In the implementation, a single serial output, carrying the sync correction data for all sites, is fed to the same computer used for wideband switching, and this computer then distributes the data according to the address supplied with the data. A privacy feature is part of the video conferencing system. When a user desires privacy, he pushes a button on his signaling device and a blank screen is substituted for his picture by the wideband switch. As a blank screen cannot be sync corrected, it is desirable to inhibit sync correction for all users that are in the privacy mode. The input portion of the split-screen computer serial port is used to receive information conveying the status of user inputs. Only changes in status are sent.

FIG. 2 shows an arrangement where five users can see 4-way split-screen presentation of all users except themselves. The implementation also provides for similar arrangements for fewer users (i.e., four people each viewing three people, and three people each viewing two people). The operator's console contains a mode selecting rotary switch which is manually set according to the number of users in the conference. This switch provides two arrangements for three participants, either a vertical or horizontal split as well as one for four participants (full width at the bottom) and for five people. Since the desired timing relationship between the sync pulses of incoming TV signals to the master sync pulses depends on the mode selected, the position of the rotary switch is made available to the split-screen computer. Five parallel input lines are dedicated to rotary switch position information. The analog color corrector circuitry provides fine color correction of about ±60°. Coarse color correction in 90° steps is provided at the user site when the correction required is too extreme for the fine circuitry. Out-of-range signals are generated by the color correction circuitry when the coarse color correction is needed. Five parallel input lines are provided to transfer the out-of-range signals to the computer from the color correction circuits. The computer generates a message that is routed to the remote site where the coarse color correction occurs.

Video Delay Circuits

Figure 7:
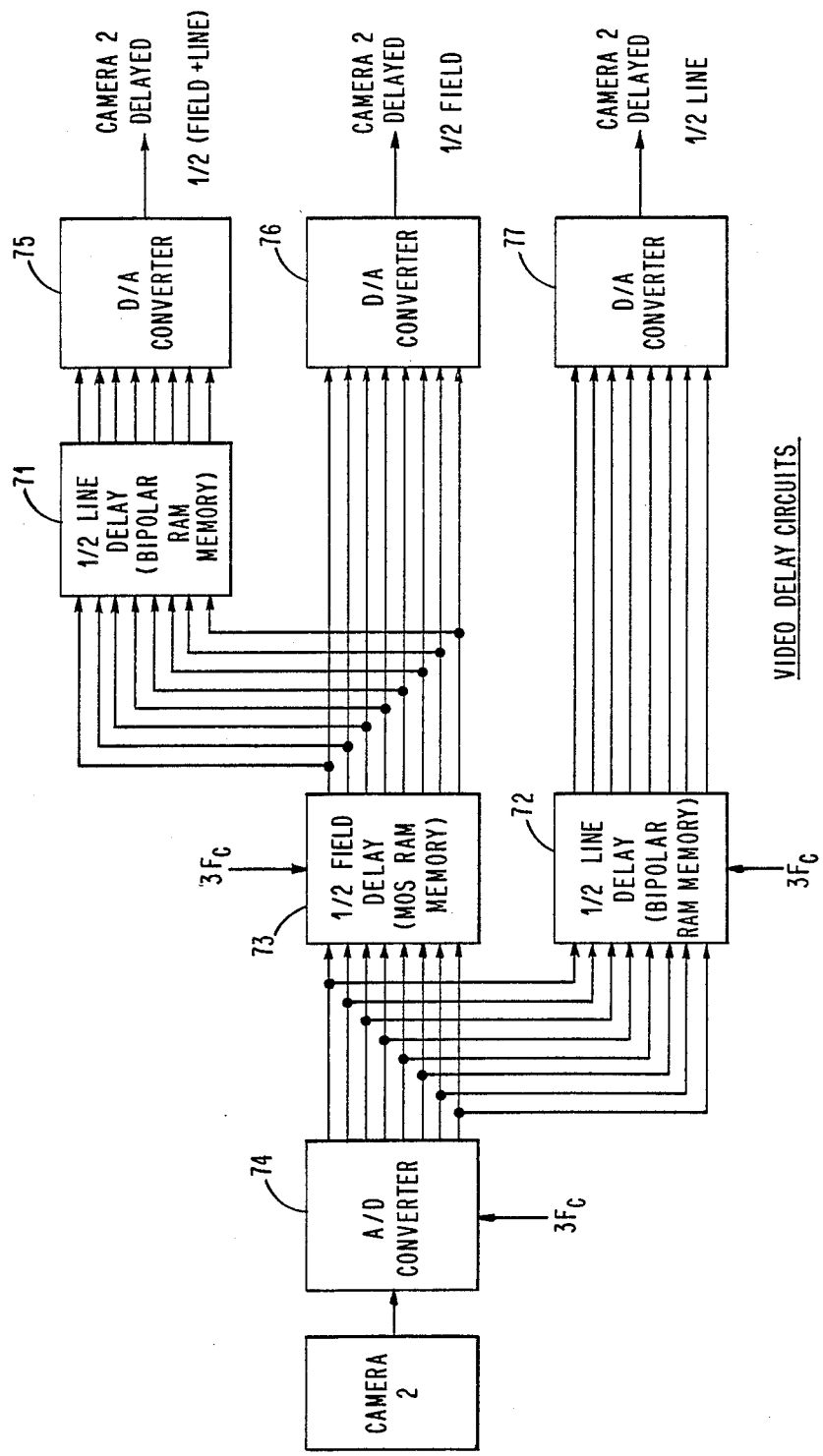
FIG. 7 shows three video delay circuits, suitable for an understanding of this invention.

FIG. 7 shows three video delay blocks; two 71, 72 for about ½ a TV line and one 73 for about ½ a TV field. These delay functions are best implemented by converting the analog TV signal to digital form (via A/D converter 74) and creating a delay by storing the digital samples in a RAM memory and later reading them out before converting them back to analog (via D/A converters 75, 76, 77) as shown in FIG. 7. A sampling frequency of three times the color subcarrier or about 10.7 MHz with 8 bits per sample is adequate. Since only one of the camera signals need be delayed, only one analog-to-digital converter 74 is used while three digital-to-analog converters 75, 76 77 are required. The half field delay 73 requires approximately 74,000 8-bit samples to be stored. Large capacity memory ICs are available only in MOS technology which do not operate at required speeds. It is, therefore, necessary to store (buffer) several samples before they are written in parallel into the memory and to read out the same number of samples and buffer them to the D/A converter output. The buffering of ten samples at a time is chosen for this application.

The half line delays 71, 72 require 307 samples and can be implemented with faster bipolar memory ICs. The faster memory avoids the need for storing samples in a buffer. Two identical independent memory systems are chosen for the two half line delay functions.

User Location Sync Control

Figure 8:
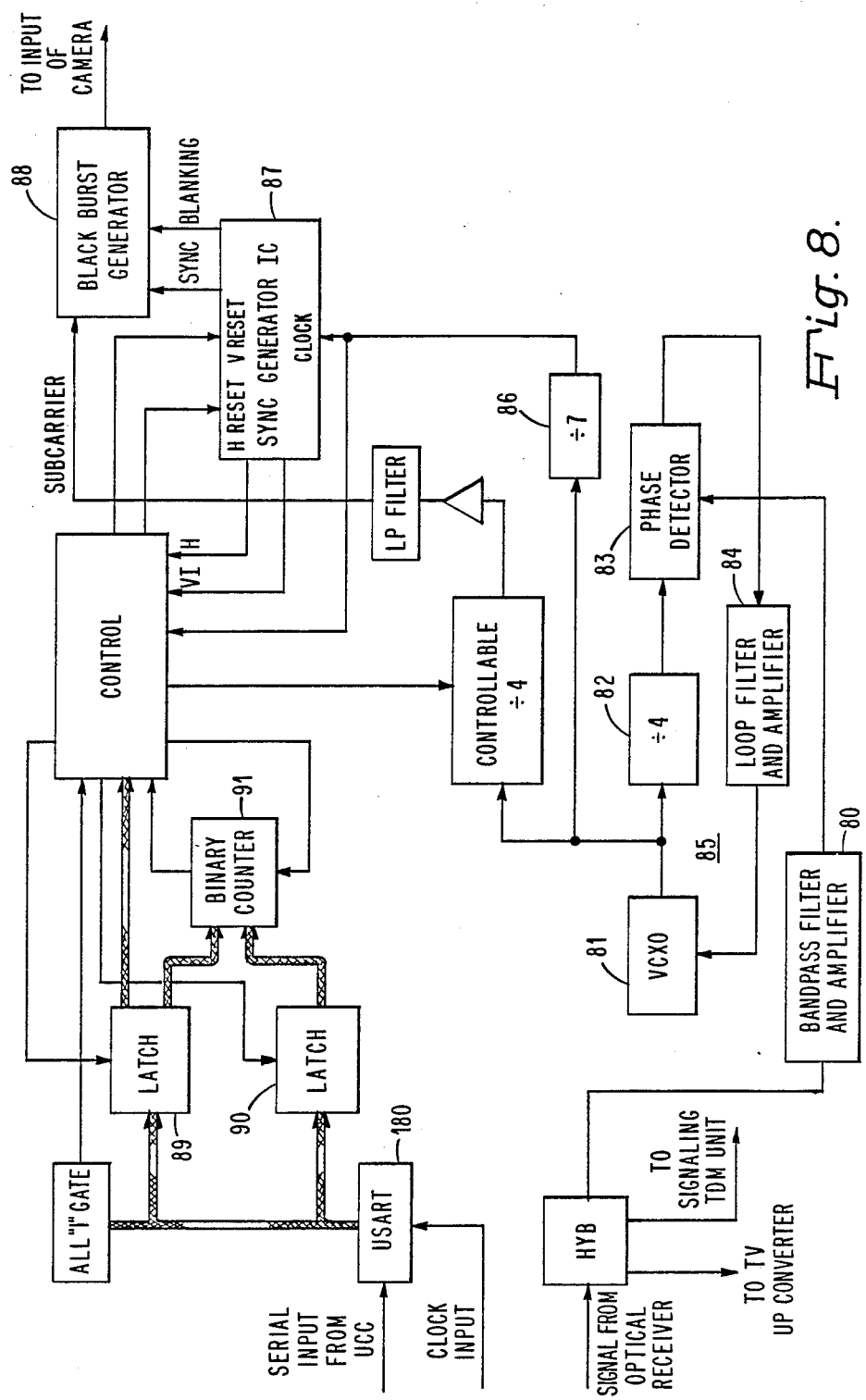
FIG. 8 is a block diagram of synchronization (sync) control hardware located at each user location.

FIG. 8 is a block diagram of the sync control hardware located at each user site. The analog output of the optical receiver is split three ways, with one part going to a bandpass filter (at the color subcarrier frequency) and amplifier 80. This filter 80 is implemented with crystals to provide a sharp bandpass characteristic. A VCXO 81, divide-by-four circuit 82, phase detector 83, and filter amplifier 84 form a phase-locked-loop 85 which is used to multiply the received subcarrier signal by four. The VCXO 81 output is divided by seven (at 86) to provide the input clock to the sync generator 87. The sync generator 87 produces sync and blanking signals which are fed to a commercial black-burst generator 88. The output of the black-burst generator 88 is used to gen-lock the TV camera. The remainder of the circuitry shown in FIG. 8 is used to change the phase of the horizontal and vertical sync and change the phase of the color subcarrier signals by 90° in response to messages received from the split-screen computer as relayed by the signaling device. A USART 180 converts the serial stream to parallel bytes. All relevant messages start with an all 1's byte followed by two information bytes and an end of message byte. Latches 89, 90 are used to store the information bytes. The first information byte contains a function code (vertical, horizontal, or color) as well as data for the case of vertical correction. An actual implementation, including provision for receiving messages for mechanical control of the camera lens, is described below. The second information byte contains data for the amount of correction except in the case of color. The amount of correction is used to preset a binary counter 91 which on command from the sync generator 87 counts down to zero.

For vertical correction, a signal generated at the end of a frame by the sync generator IC 87 (the vertical index) is used to start the counting using the horizontal sync drive as the clock. When the counter 91 reaches zero, a pulse is applied to the vertical reset input of the sync generator 87 which causes the internal vertical counter to be reset. This resetting causes a jump in the phase of the vertical output of the sync generator 87. Similarly, the horizontal sync correction function uses the horizontal pulse to start the count down and the 130 times horizontal frequency as the clock. At the end of counting, the horizontal reset input of the sync generator 87 is pulsed, resetting the internal horizontal counter of the sync generator 87 and changing the phase of the horizontal sync.

A color correction command causes the controllable divide-by-four circuit 82 to divide by three, once, causing a 90° phase shift in the color subcarrier signal.

Also included on the user site sync control board is hardware for controlling the zoom and focus of the TV camera lens. In the implementation, a single camera is used for viewing a person or for viewing a document on his desk.

A system of mirrors including one that can move to one of two positions determines what the TV camera sees. Storage of the zoom and focus position for each mode is made in battery backed up CMOS counters. A servo system using a potentiometer that is mechanically coupled to the lens focus or zoom ring continuously compares the lens position to an analog voltage derived from the stored digital values, and drives a motor coupled to the lens ring and potentiometer to keep equal. In addition to stored zoom and focus values for document and person modes, an additional zoom value is stored for split-screen operation. Because only a limited portion of each camera output is displayed in split screen, it is likely that a wider angle zoom setting is desirable for this mode When camera modes are changed, the last used values for zoom and focus for the new mode take over the control.

It is apparent from a reading of this specification that various modifications will suggest themselves without departing from the spirit and scope of the appended claims. For example, a display may depict conferees utilizing non-equal locational areas.

What is claimed is:

1. A method of generating a split-screen video display for conferees located at n different sites, wherein n is an integer greater than two, comprising the steps of
    focusing video cameras centrally onto respective conferees at respective ones of said different sites, and
    providing each of said conferees with a different respective monitor display of the remaining conferees at different locations on said monitor, said provision of the different locations of said remaining conferees being determined electronically, rather than by panning or tilting of said cameras.

2. The method as recited in claim 1 wherein a signal from each of said cameras can be remotely delayed a fraction of a line scan.

3. The method as recited in claim 1 wherein a signal from each of said cameras can be remotely delayed a fraction of a field.

4. The method as recited in claim 1 wherein one of said cameras provides, on a first output, an undelayed signal, and provides on a second output a signal delayed by a fraction of a line scan.

5. The method as recited in claim 4 wherein said fraction is one-half, when n≦5.

6. The method as recited in claim 1 wherein one of said cameras provides on a first output, an undelayed signal, and provides on a second output a signal delayed a fraction of a field.

7. The method as recited in claim 6 wherein said fraction is one-half, when n≦5.

8. The method as recited in claim 1 wherein one of said cameras provides on a first output, an undelayed signal, provides on a second output a signal delayed a fraction of a line scan, provides on a third output a signal delayed a fraction of a field, and provides on a fourth output a signal delayed by a fraction of a line scan plus a fraction of a field.

9. The method as recited in claim 8 wherein said fraction is one-half, when $n \leq 5$.

10. Apparatus for generating a splitscreen video display for n conferees located at n different sites, where n is an integer greater than two, comprising
- n video cameras focused centrally onto respective conferees at said different sites,
- n monitor displays, provided at said different sites, to display (n−1) conferees thereon, each monitor display at a respective site showing the conferees not present at said respective site, and
- electronic means for achieving the display of the remaining conferees at different locations on the monitor display at which said remaining conferees are not present, rather than by panning or tilting of said cameras.

11. The apparatus as recited in claim 10 wherein a signal from each of said cameras at each of said sites is delayed a fraction of a line scan.

12. The apparatus as recited in claim 10 wherein a signal from each of said cameras at each of said sites is delayed a fraction of a field.

13. The apparatus as recited in claim 10 wherein one of said cameras provides, on a first output, an undelayed signal, and provides on a second output a signal delayed by a fraction of a line scan.

14. The apparatus as recited in claim 13 wherein said fraction is one-half

15. The apparatus as recited in claim 10 wherein one of said cameras provides on a first output, an undelayed signal, and provides on a second output a signal delayed a fraction of a field.

16. The apparatus as recited in claim 15 wherein said fraction is one-half.

17. The apparatus as recited in claim 10 wherein one of said cameras provides on a first output, an undelayed signal, provides on a second output a signal delayed a fraction of a line scan, provides on a third output a signal delayed a fraction of a field, and provides on a fourth output a signal delayed by a fraction of a line scan plus a fraction of a field.

18. The apparatus as recited in claim 17 wherein said fraction is one-half.

* * * * *